United States Patent
Negishi et al.

(10) Patent No.: US 7,902,760 B2
(45) Date of Patent: Mar. 8, 2011

(54) ELECTRON EMISSION DEVICE, AND DRIVING METHOD THEREOF

(75) Inventors: Nobuyasu Negishi, Tsurugashima (JP); Kazuto Sakemura, Tsurugashima (JP); Takamasa Yoshikawa, Tsurugashima (JP); Kiyohide Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 756 days.

(21) Appl. No.: 11/631,487

(22) PCT Filed: Jun. 24, 2005

(86) PCT No.: PCT/JP2005/012156
§ 371 (c)(1),
(2), (4) Date: Dec. 10, 2007

(87) PCT Pub. No.: WO2006/006423
PCT Pub. Date: Jan. 19, 2006

(65) Prior Publication Data
US 2008/0203947 A1 Aug. 28, 2008

(30) Foreign Application Priority Data
Jul. 8, 2004 (JP) .............................. 2004-201672

(51) Int. Cl.
*G09G 3/10* (2006.01)
*H01J 1/62* (2006.01)
(52) U.S. Cl. .................................... 315/169.1; 313/497
(58) Field of Classification Search ............. 315/169.1, 315/169.2, 169.3; 345/75.2, 74.1, 76; 313/497; 445/46, 49
See application file for complete search history.

(56) References Cited

U.S. PATENT DOCUMENTS

| | | | | |
|---|---|---|---|---|
| 6,144,350 A | * | 11/2000 | Fujii et al. | 345/74.1 |
| 6,404,124 B1 | * | 6/2002 | Sakemura et al. | 313/495 |
| 6,744,063 B2 | * | 6/2004 | Yoshikawa et al. | 257/10 |
| 7,190,334 B2 | * | 3/2007 | Kawase et al. | 345/75.2 |

FOREIGN PATENT DOCUMENTS

| | | |
|---|---|---|
| JP | 9-50256 | 2/1997 |
| JP | 2000-082387 | 3/2000 |
| JP | 2000-227777 | 8/2000 |
| JP | 2003-255882 | 9/2003 |
| JP | 2004-512559 | 4/2004 |

\* cited by examiner

*Primary Examiner* — Douglas W Owens
*Assistant Examiner* — Minh D A
(74) *Attorney, Agent, or Firm* — Drinker Biddle & Reath LLP

(57) ABSTRACT

Provided is a method of driving an electron emission apparatus that drives the apparatus including a plurality of electron emission devices each having an electron supply layer formed of silicon, a silicon-based mixture or a compound thereof, an insulator layer formed on the electron supply layer and a thin film metal electrode formed on the insulator layer. The plurality of electron emission devices are sealed and the method includes: a driving step for supplying power between the electron supply layer and the thin film metal electrode to cause electrons to be emitted from the electron emission device and a reactivating step for applying a reactivating voltage at a level equal to or higher than an applied voltage value which causes discontinuity in differential value of the device current flowing between the electron supply layer and the thin film metal electrode with respect to the applied voltage.

16 Claims, 16 Drawing Sheets

ELECTRON EMISSION DEVICE, AND DRIVING METHOD THEREOF

TECHNICAL FIELD

The present invention relates to an electron emission device and, more specifically, to an electron emission apparatus in which a plurality of electron emission devices are arranged into an image display array, for example, a matrix pattern, and to a method of driving the same.

BACKGROUND ART

In the related art, an attempt has been made to develop a flat electron emission apparatus having an array of electron emission sources formed of cold cathodes, which does not require heating of the cathodes. Examples include a FED using a Spindt cold cathode as an electron emitting portion of a display device. The light-emitting principle thereof is the same as a CRT (cathode ray tube), and light rays are emitted by leading electrons into vacuum environment by a gate electrode located apart from the cold cathode to cause the electrons to collide with fluorescent material applied on a transparent anode (see Patent Documents 1 to 3 listed below).

On the other hand, the electron emission source of this type has a problem such that the manufacturing process of a minute Spindt cold cathode is complicated and a large number of processes are required, and therefore a process yield is low.

There is also a flat electron emission apparatus in which an electron emission device having a metal-insulator-semiconductor (MIS) structure or a metal-insulator-metal (MIM) structure is used. For example, there is an electron emission apparatus disclosed in Patent Document 4 by the applicant of the present invention listed below.

In general, the MIM or MIS electron emission device having an insulator layer as thick as several tens nm to several mm can hardly achieve electron emission only by manufacturing the device. Therefore, so-called "forming process" is required. The forming process is very low in controllability, and hence it is difficult to manufacture the device stably with desirable reproducibility.

As another type of the electron emission device, there is also a surface conducting electron emission device having an electron emitting portion formed of a crack in a conductive thin film provided by forming the conductive thin film between opposed electrodes provided on an insulating substrate and supplying electricity. The crack is formed by locally disrupting, transforming or deforming the conductive thin film, whereby there are problems such that the uniformity of the interior of the electron emitting portion and reproducibility of the initial performance are insufficient. In order to solve such problems, various attempts have been made to improve the electron emission apparatus (see Patent Documents 5 to 8 listed below).

Patent Document 1: JP-A 2003-141983
Patent Document 2: JP-A 08-171877
Patent Document 3: JP-A 07-029520
Patent Document 4: U.S. Pat. No. 6,285,123
Patent Document 5: JP-A 2000-251677
Patent Document 6: JP-A 2000-251688
Patent Document 7: JP-A 2000-82388
Patent Document 8: JP-A 09-199006

DISCLOSURE OF THE INVENTION

According to the solid electron emission device in the related art, the emission current density decreases with drive time. Therefore, in a constant-voltage driving which expresses gradations in pulse width modulation (constant voltage), which is often seen in a drive when these devices are used in the display, deterioration of luminance is resulted. In contrast, when the drive is performed in a constant-current control, deterioration of the emission current can be prevented by increasing the drive voltage. On the other hand, when the drive voltage is increased, change of the devices with time increases. That is, this type of drive accelerates the change with time in a positive-feedback manner, and consequently, elongation of lifetime of the display is not achieved.

In the solid electron emission device which requires the forming process, the emission current density generally changes with drive time. In order to elongate the lifetime of the devices, it is required to reduce the change with time as much as possible.

When activation of the solid electron emission devices is performed in a gas environment including carbon during manufacturing process in order to increase the emission current density, even though the variations in characteristics can be supplemented by activation in the initial stage, restoration of the characteristics cannot be achieved for the change with time after shipment (see Patent Document 6 listed above).

Therefore, one of the objects to be achieved by the present invention is to provide an electron emission apparatus in which the change with time is restrained and a method of driving the same.

According to the present invention, there is provided a method of driving an electron emission apparatus which includes a plurality of electron emission devices each having an electron supply layer formed of silicon, a silicon-based mixture or a compound thereof, an insulator layer formed on the electron supply layer and a thin film metal electrode formed on the insulator layer, the plurality of electron emission devices being sealed, the method including:

a driving step for supplying power between the electron supply layer and the thin film metal electrode to cause electrons to be emitted from the electron emission device, and a reactivating step for applying a reactivating voltage at a level equal to or larger than an applied voltage value which causes discontinuity in differential value of the device current flowing between the electron supply layer and the thin film metal electrode with respect to the applied voltage.

According to the present invention, there is provided an electron emission apparatus which includes a plurality of electron emission devices each including an electron supply layer formed of silicon, a silicon-based mixture or a compound thereof, an insulator layer formed on the electron supply layer, and a thin film metal electrode formed on the insulator layer, the plurality of electron emission devices being sealed, wherein a reactivation apparatus for applying a reactivating voltage at a level equal to or larger than an applied voltage value which causes discontinuity in differential value of the device current flowing between the electron supply layer and the thin film metal electrode with respect to the applied voltage.

BRIEF DESCRIPTION OF THE DRAWING

FIG. 15 is a block diagram showing a configuration of a display device in which the electron emission apparatus according to the still another embodiment of the present invention is used.

DETAILED DESCRIPTION OF THE INVENTION

Figure 1:
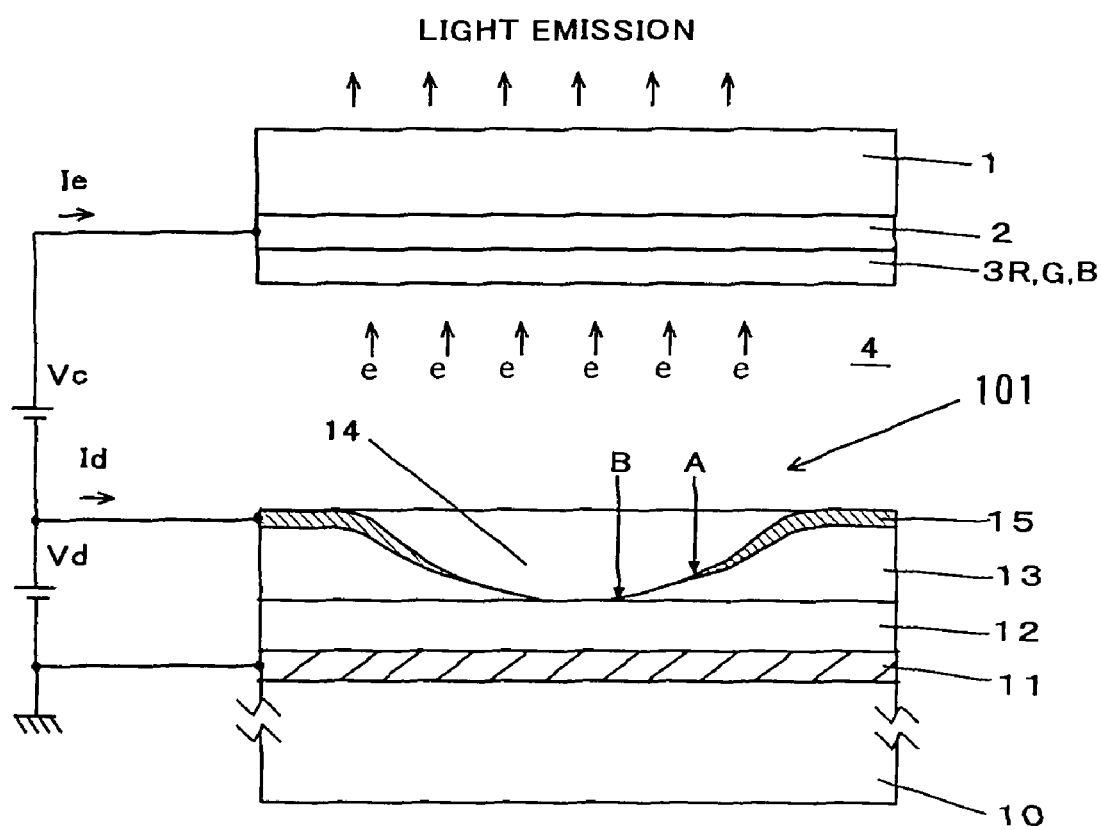
FIG. 1 is a pattern diagram showing a configuration of an electron emission device and a light-emitting unit using the same according to an embodiment of the present invention.

Referring now to the drawings, embodiments of the present invention will be described.

(Electron Emission Device)

FIG. 1 shows an MIS electron emission device 101 according to an embodiment having a laminated layer structure including a lower electrode (ohmic electrode) 11, an electron supply layer 12, an insulator layer 13 and a thin film metal electrode (upper electrode) 15 laminated in sequence on a device substrate 10 formed of glass. The lower electrode 11 includes, for example, aluminum (Al), tungsten (W), titanium nitride (TiN), copper (Cu), and chrome (Cr). The electron supply layer 12 includes a semiconductor of amorphous phase such as silicon (Si), a Si-based mixture, or a compound thereof. The insulator layer 13 includes a dielectric such as $SiO_x$ (X=0.1 to 2.2). In the case of this device, the insulator is not a perfect insulator, but an imperfect insulator having a number of sub-bands caused by dangling bond, oxygen shortage or contained impurities. The thin film metal electrode 15 is formed of metal such as tungsten (W), molybdenum (Mo), platinum (Pt) and gold (Au). In the electron emission device 101, the insulator layer 13 and the thin film metal electrode 15 each are provided with an island area 14 whose film thickness decreases gradually toward the center thereof. As shown in FIG. 1, for example, the island area 14 is formed as a recess on a flat surface of the thin film metal electrode 15. Although the electron supply layer is an amorphous material, it is effective to partly crystallize in an activation process as described later.

The insulator layer 13 and the thin film metal electrode 15 each are provided with the recess 14, that is, the island area 14 whose film thickness is gradually reduced toward the center thereof. As shown in FIG. 1, the island area 14 is formed as a recess (circle, oval, long circle, groove etc.) on the flat surface of the thin film metal electrode 15, and a carbon area 40 is laminated on the island area 14. In the island area 14, the thin film metal electrode 15 ends at an upper edge A of the insulator layer 13. The insulator layer 13 in the island area 14 ends at an upper edge B of the electron supply layer 12.

Materials of the substrate, the electron supply layer 12, the insulator layer 13 and the thin film metal electrode 15 of the electron emission device, the thicknesses of the respective films, film-forming methods and manufacturing methods, being described in Patent Document 4 listed above by the applicant of the present invention, are quoted here.

Figure 2:
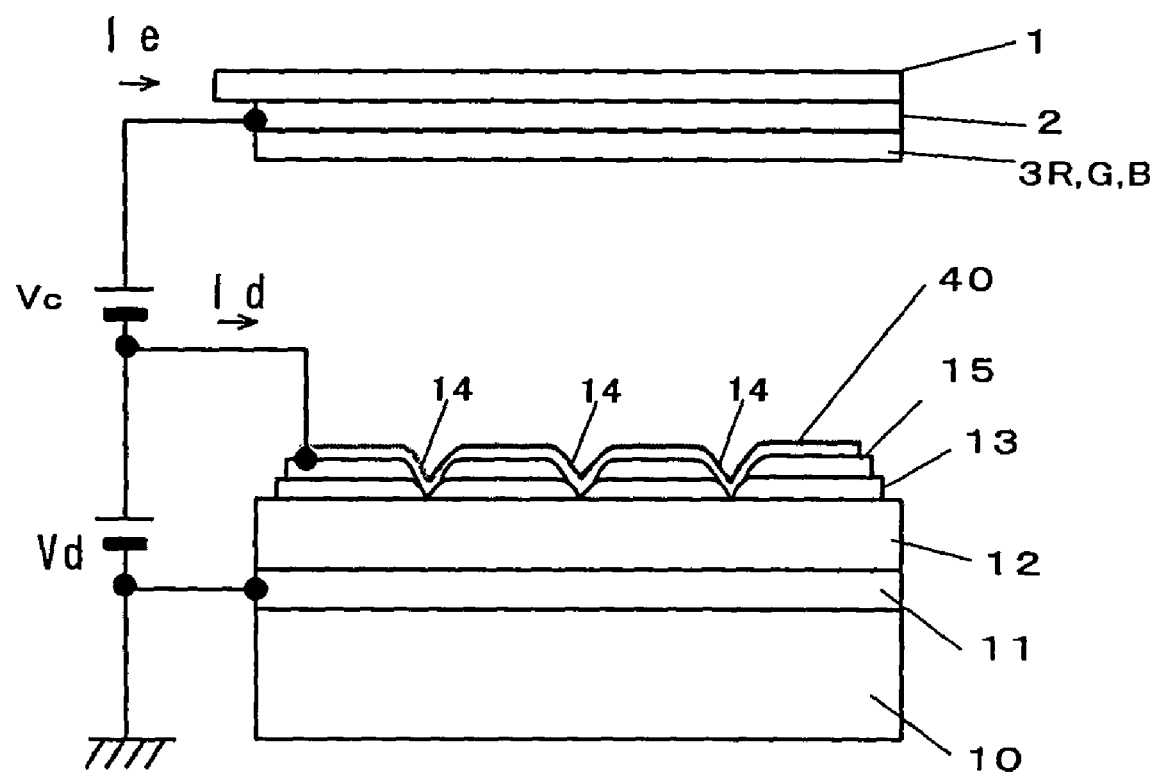
FIG. 2 is a pattern diagram showing a configuration of the electron emission device and the light-emitting unit using the same according to the embodiment of the present invention.

In addition, as shown in FIG. 2, the electron emission device 101 may also have the carbon area 40 formed of carbon, a carbon-based mixture, or carbon compound on at least the recessed island area 14 on top thereof. By coating the upper electrode with a carbon layer, the equivalent effect is effectively obtained.

Effective materials for the carbon area 40 include carbon in the forms of amorphous carbon, graphite, fullerene (C2n), diamond-like carbon, carbon nano-tube, carbon nano-fiber, carbon nano-horn, carbon nano-coil, carbon nano-plate, diamond, or carbon compound such as ZrC, SiC, WC, and MoC. The carbon area 40 covers the thin film metal electrode 15, the insulator layer 13 and the electron supply layer 12.

(Light-Emitting Device Using Electron Emission Device)

When using the electron emission device 101 in the light-emitting device, as shown in FIG. 1, the electron emission device 101 is placed with the device substrate 10 on the back side and a transmissive second substrate 1 opposed thereto is held as a front substrate with a vacuum space 4 sandwiched therebetween. The second substrate 1 is provided with a transmissive anode 2 connected to an acceleration power source Vc and fluorescent material layers 3R, G, B on the inner surface thereof. Materials of the anode 2 and the respective substrates, the thicknesses of the respective films, film-forming methods and manufacturing methods, being described in Patent Document 4 listed above by the applicant of the present invention, are quoted here.

The electron emission device is connected to the device power source Vd, and the thin film metal electrode 15 on the front side has a positive potential Vd and the lower electrode 11 on the back side has a ground potential. When a voltage Vd, for example, about 50 V, is applied between the lower electrode 11 and the thin film metal electrode 15 to provide electrons to the electron supply layer 12, some of the electrons are emitted to vacuum through an emission site formed by an activation process in advance. The electrons are emitted from the bottom portion of the island area 14 at a certain angular dispersion. In the device structure shown in FIG. 1, an electric field forms a lens in an upper space of the island area 14 as the recess, so that the track of the emitted electrons is changed to a direction along a normal line. Consequently, emitted electrons having an extremely small angular dispersion are obtained.

The electrons e (emitted current Ie) emitted from the recess of the island area 14 is accelerated by a high acceleration voltage Vc, for example, a voltage about 5 kV, applied to the opposed anode (transparent electrode) 2, and are collected to the anode 2. When the fluorescent material 3R, G, B is applied on the anode, corresponding visible light is emitted.

Since the electron emission device includes the island area in which the insulator layer and the upper electrode decrease gradually toward a film thickness of zero, it is effective for stability of emitted current or drive pressure reduction.

(Activation Process and Reactivation Process of Electron Emission Device)

The activation process described above is an electricity supplying process by a sweep of an applied voltage. The sweep is a voltage applying mode in which the potential of the thin film metal electrode increases uniformly in reference to the electron supply layer.

Figure 3:
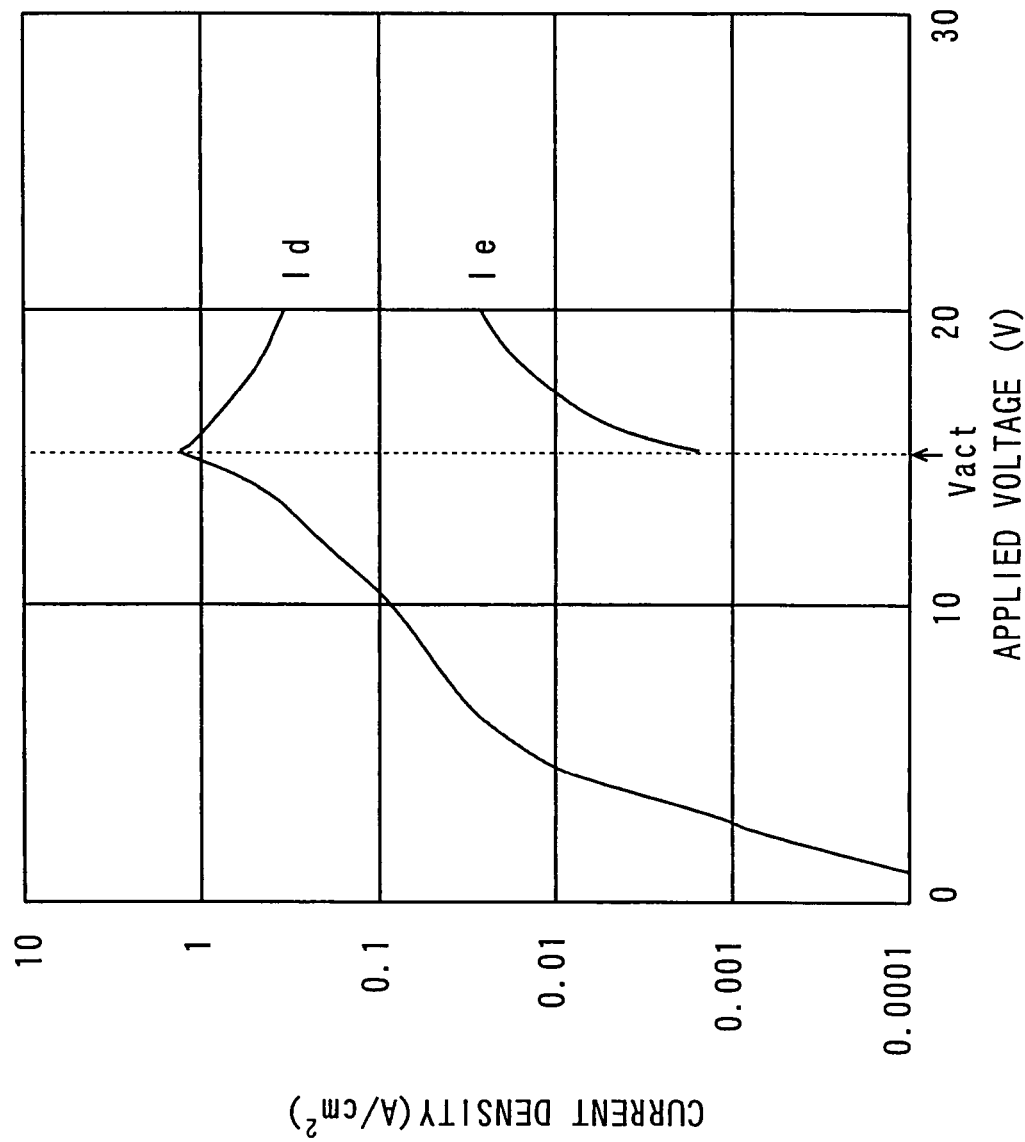
FIG. 3 is a graph showing a current-voltage characteristic curve of the electron emission device according to the embodiment of the present invention.

After having sealed the electron emission device in vacuum in the example, the current supplying process is performed with a voltage Vd from 0 V to 20 V at 0.3 V/seconds, and the change of the current and voltage is measured. FIG. 3 shows a current-voltage characteristic curve of a device current density (Id) and an emission current density (Ie) of the electron emission device in a sweep activation process. The device current density and the emission current density are values calculated from the measured values of the device current and the emission current, and the surface area of the device used in the experiment.

It is understood from FIG. 3 that the negative resistance characteristic is observed in the Id characteristic curve at the time of activation, and that emission of electrons (Ie) started at the timing when the negative resistance started.

In the MIS electron emission device including the lower electrode, the electron supply layer including a semiconductor, the insulator layer and the electron supply layer, the activation process here means a current supplying process for applying an activation voltage equal to or higher than a negative resistance starting point Vact which causes discontinuity in differential value of the device current Id curve with respect to the applied voltage.

It is estimated that the negative resistance observed from the negative resistance starting point Vact, in FIG. 3, is a process in which the electrons are captured in a trap of an $SiO_x$ insulator layer, whereby the electric field in the vicinity of the surface of the $SiO_x$ insulator layer increases to a large value, so that electron emission occurs.

The sweep velocity is an important parameter for the activation.

When the sweep velocity is low, the negative resistance starting point Vact appears on the lower-voltage side, and when the sweep velocity is high, it appears on the higher-voltage side.

It is supposed that heat (Joule heat) accumulated in the device also contributes to the activation.

As a matter of course, the voltage sweep (sweep) at a constant velocity is not necessarily required and a mode of voltage rising is not limited in the process of increasing the voltage to a level sufficient for performing a predetermined activation process within a predetermined period. Furthermore, rectangular voltage application is also possible. In this case, discontinuous points of the differential curve of the device current Id are observed in so-called transient phenomena.

Although the power source of the sweep activation process does not necessarily have to be a DC power source, the negative resistance starting point Vact does not appear with a pulse waveform for driving a display such as a duty $\frac{1}{120}$ at 60 Hz. It is estimated to be because heat (Joule heat) accumulated in the device is insufficient for the Vact appearance.

Figure 4:
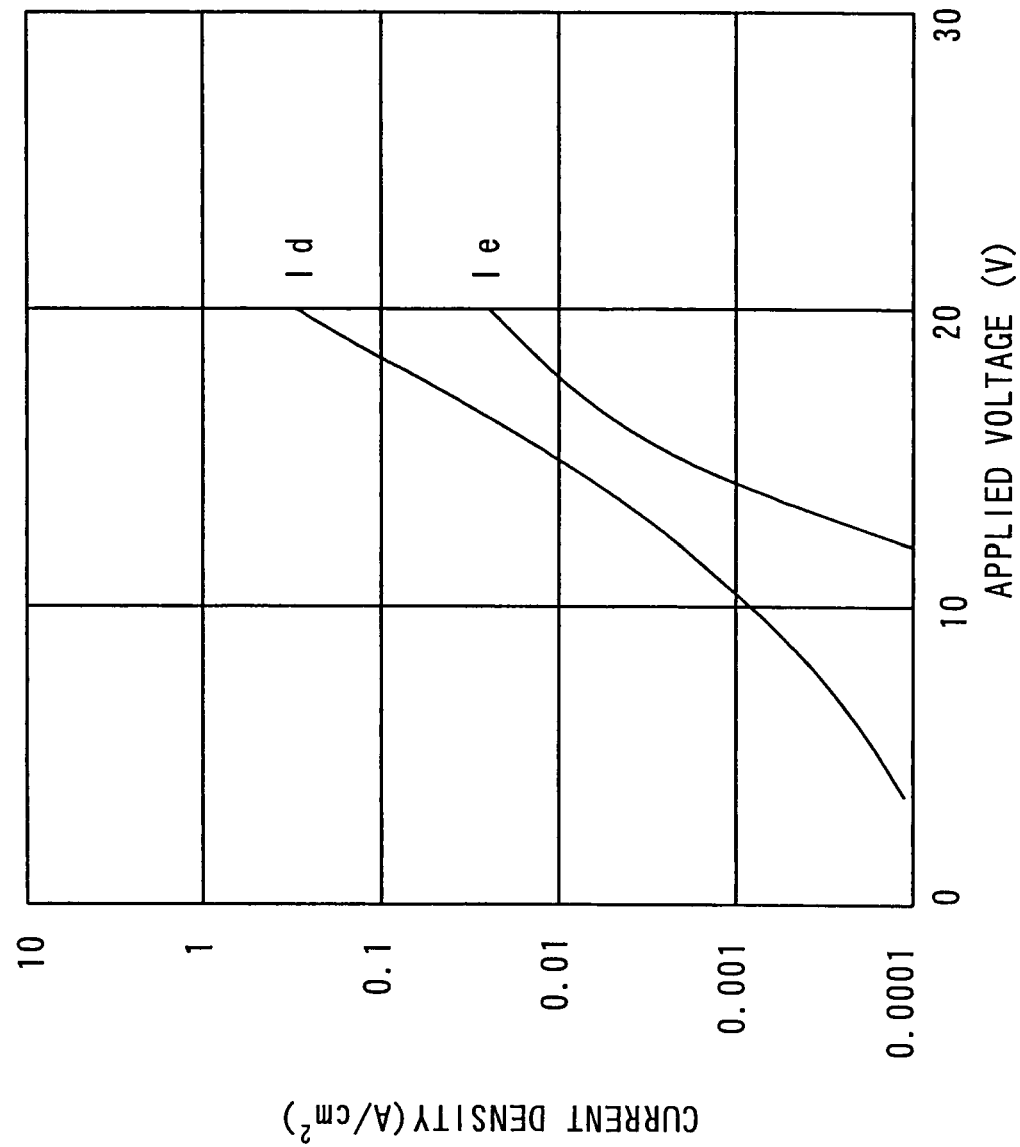
FIG. 4 is a graph showing the current-voltage characteristic curve of the electron emission device according to the embodiment of the present invention.

FIG. 4 shows a current-voltage curve of the electronic emission device at the time when the voltage is swept under the same conditions as the activation immediately after the activation. In this case, the negative resistance is not observed in Id. That is, the Vact does not appear. Therefore, it is estimated that trapped electrons are fixed.

Figure 5:
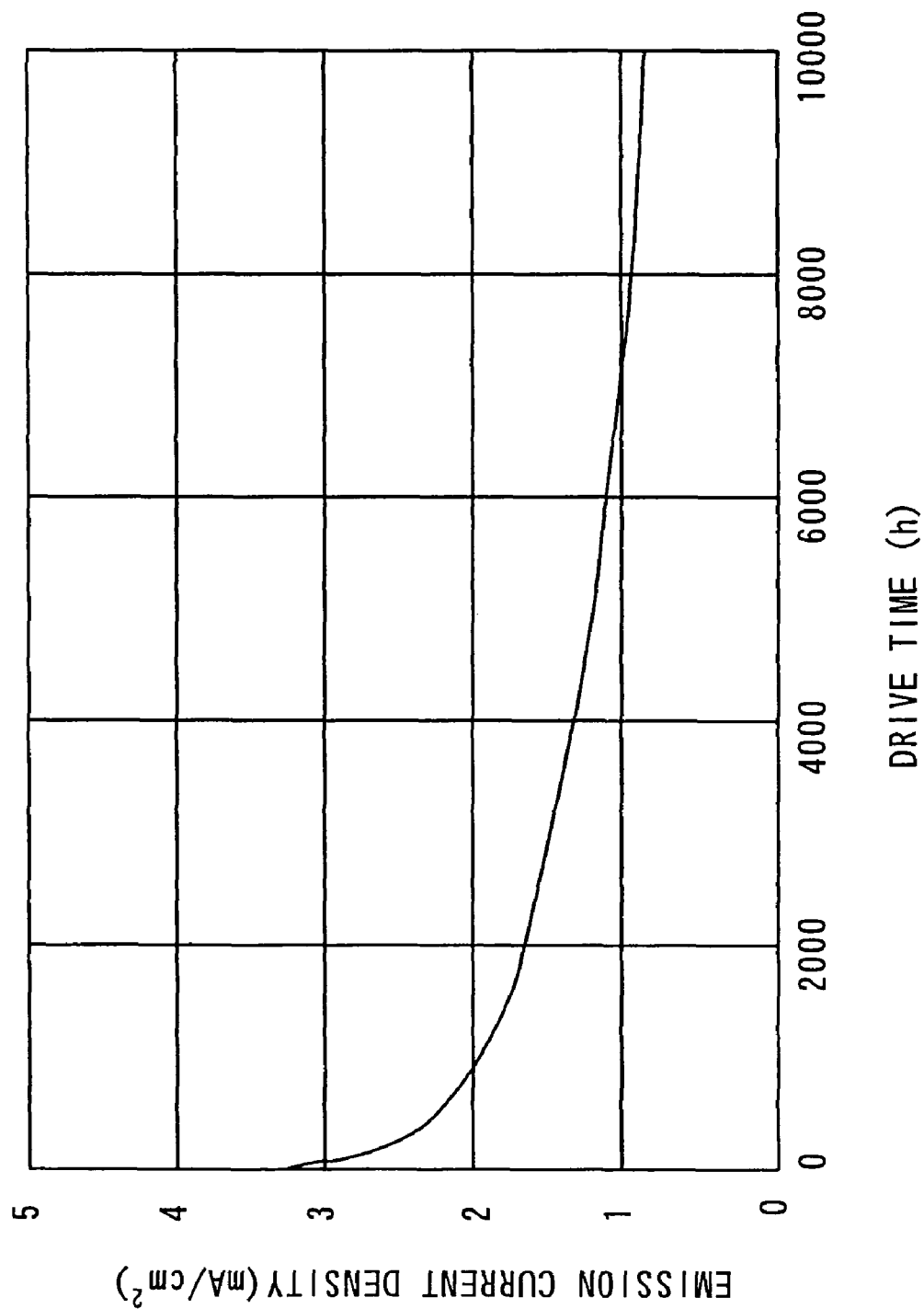
FIG. 5 is a graph showing a change in emission current density with respect to drive time of the electron emission device according to the embodiment of the present invention.

Subsequently, after having sealed the electron emission device in vacuum, assuming the normal drive, the device voltage Vd=20 V was continuously applied with pulses at the duty $\frac{1}{120}$ at 60 Hz to measure a change in emission current density with respect to the drive time. According to FIG. 5, it is understood that the emission current density reduces with the drive time. Therefore, in the constant voltage drive which expresses gradations with the pulse width modulation (voltage constant) which is seen often in display driving, deterioration of luminance may be resulted. A time until the luminance goes down by half, which is generally used as a definition of the lifetime of the display, is about 3000 hours in this case. In order to obtain a sufficient luminance as a display, an emission current density of 1 $mA/cm^2$ is required. When this respect is defined to be the lifetime of the display, it is about 7000 hours.

In contrast, when the constant current control is employed for driving, lowering of the emission current can be prevented by increasing the drive voltage. On the other hand, the change with time increases with increase of the drive voltage. That is, such driving accelerates the change with time in a positive-feedback manner, and hence increase of the lifetime of the device is not achieved as a consequence.

Figure 6:
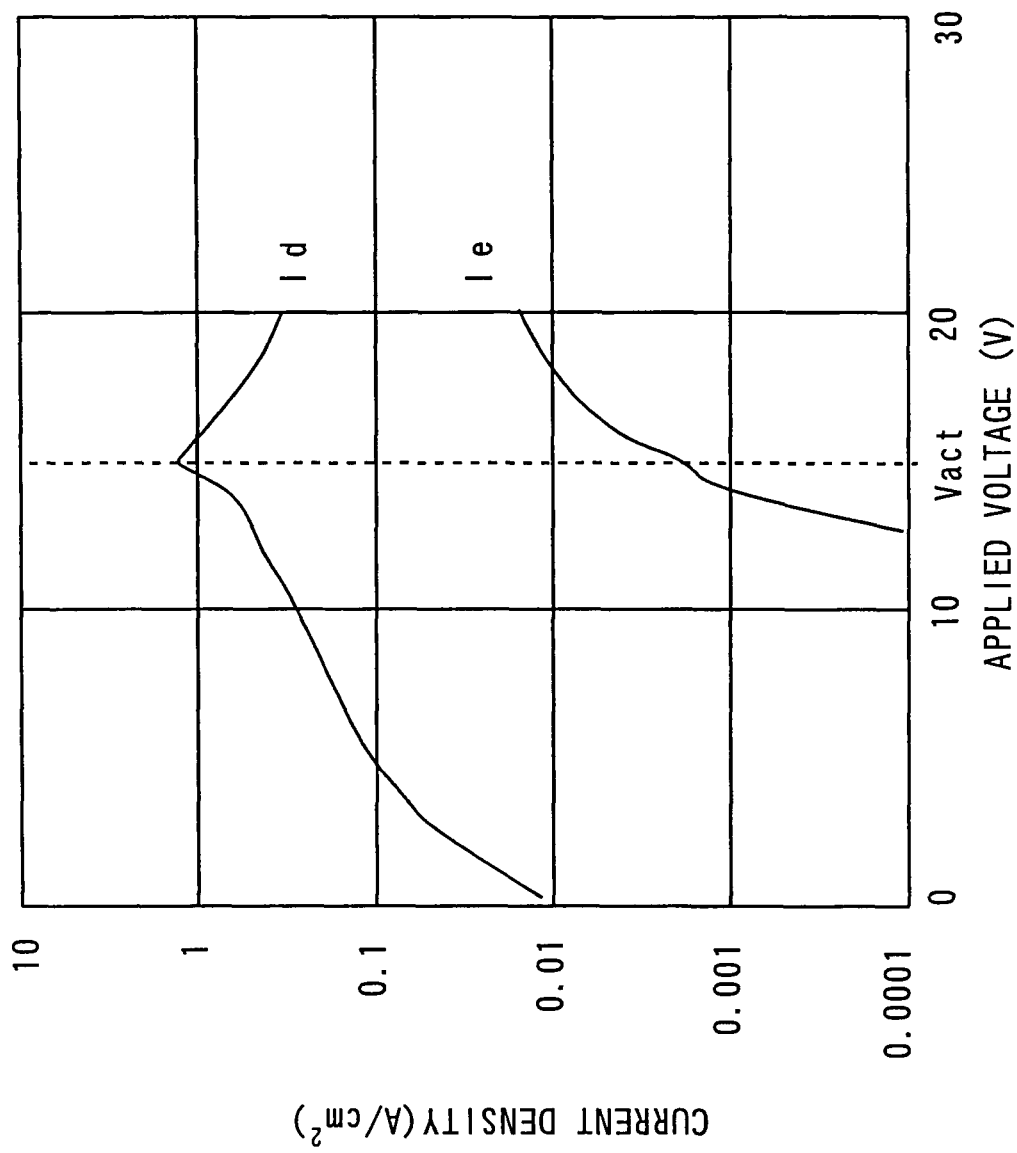
FIG. 6 is a graph showing the current-voltage characteristic curve of the electron emission device according to the embodiment of the invention.

In the MIS electron emission device described above, the inventor made an attempt to perform the activation process again after the change with time due to long time driving after the vacuum sealing. That is, after having sealed the electron emission device in vacuum, the device voltage Vd=20 V was continuously supplied with pulses of at the duty of $\frac{1}{120}$ at 60 Hz assuming the normal driving to drive for 3000 hours, the Vd from 0 V to 20 V was applied at 0.3 V/sec as the current supplying process by the sweep to measure the change in current voltage. FIG. 6 shows a current-voltage characteristic curve between the device current density (Id) and the emission current density (Ie) of the electron emission device in the reactivation process.

According to FIG. 6, a negative resistance starting point Vact of the reactivation appears on the Id curve, and the region which indicates the negative resistance appeared again. When compared with the characteristics in FIG. 4 immediately after the first activation, it is understood that the lowering of the emission current density in this device is a process of returning to the state before activation rather than the deterioration of the device. It is estimated to be a process that the electrons trapped in the $SiO_x$ insulator layer come off. Therefore, when a drive voltage is applied to the electron emission device, an electric current flows by hopping conduction. On the other hand, it is considered that the negative resistance appears in the same manner as the first activation process since the electrons are captured again in the trap at a voltage higher than a certain voltage. It is estimated that the amount of electron emission is restored with these trapped electrons, and the electric field in the vicinity of the surface of the $SiO_x$ insulator layer increases again to a large value.

That is, the inventor found that the lowering of the emission current density due to the long time driving of the MIS electron emission device (including the lower electrode, the electron supply layer having semiconductor, the insulator layer, and the electron supply layer) is not irreversible deterioration, but the initial characteristics can be restored by reactivation. The activation of the device is enabled by applying the reactivation voltage higher than the negative resistance starting point Vact which causes discontinuity in the differential value of the device current Id curve in the current-voltage characteristics of the electron emission device.

The negative resistance starting point Vact for the reactivation corresponds to an applied voltage value at a moment when a discontinuity of the differential value of the device current between the electron supply layer and the thin film metal electrode with respect to the applied voltage appears when a voltage which increase uniformly is applied between the electron supply layer and the thin film metal electrode.

(Electron Emission Apparatus)

The inventor proposes an electron emission apparatus including the activation apparatus using the electron emission devices each having the electron supply layer which demonstrates the above-described current-voltage characteristics, the insulator layer and the thin film metal electrode (island area electron emitting portion) whose film thickness gradually decreases.

Figure 7:
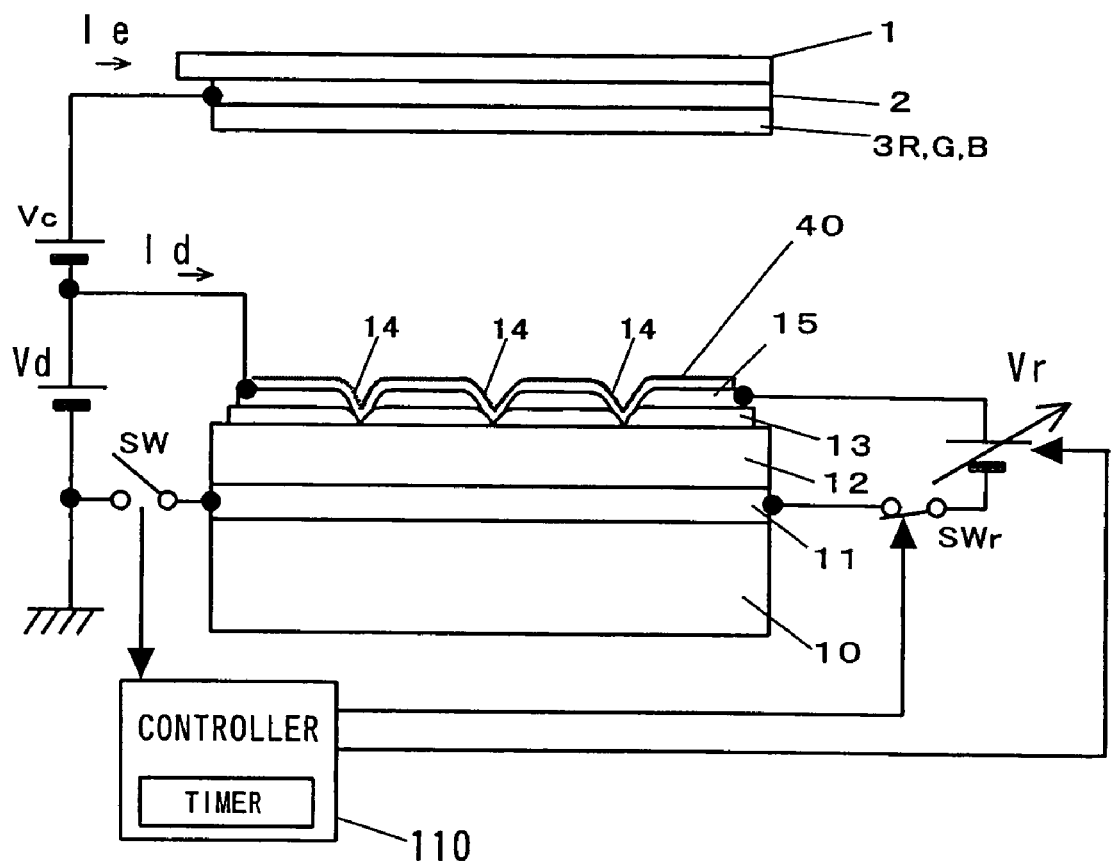
FIG. 7 is a pattern diagram showing a configuration of the electron emission device and the light-emitting unit using the same according to the embodiment of the invention.

FIG. 7 shows the electron emission apparatus as described above. The electron emission device 101 is the same as those shown in FIG. 1 and FIG. 2.

In the electron emission apparatus, for example, a working switch SW connected in series between the device power source and the lower electrode 11, a power supply switch SWr connected in series between the upper electrode 15 and the lower electrode 11 and a sweep activation process power source Vr are provided. The electron emission apparatus includes a controller 110 as a control unit for observing the state of the working switch SW, controlling ON status or OFF status of the power supply switch SWr, and controlling the state of application (execution of application of the reactivation voltage between the electron supply layer and the thin film metal electrode) of the sweep activation process power source Vr. The controller 110 includes a storage device for storing required data or the like and a timer (clocking means) integrated therein. The activation apparatus including these members is connected to the electron supply layer and the thin film metal electrode to apply the reactivation voltage equal to or higher than the negative resistance starting point Vact therebetween. For example, the controller 110 of the reactivation apparatus measures a sum of the elapsed time from the point when the supply of power to the electron emission device is started, and turns ON the power supply switch SWr when the sum of the elapsed time exceeds a reference value (for example, the term until the emission current of the electron emission device goes down by half, 3000 hours in this example) to control execution of application of the reactivation voltage from the sweep activation process power source Vr between the electron supply layer and the thin film metal electrode.

Figure 8:
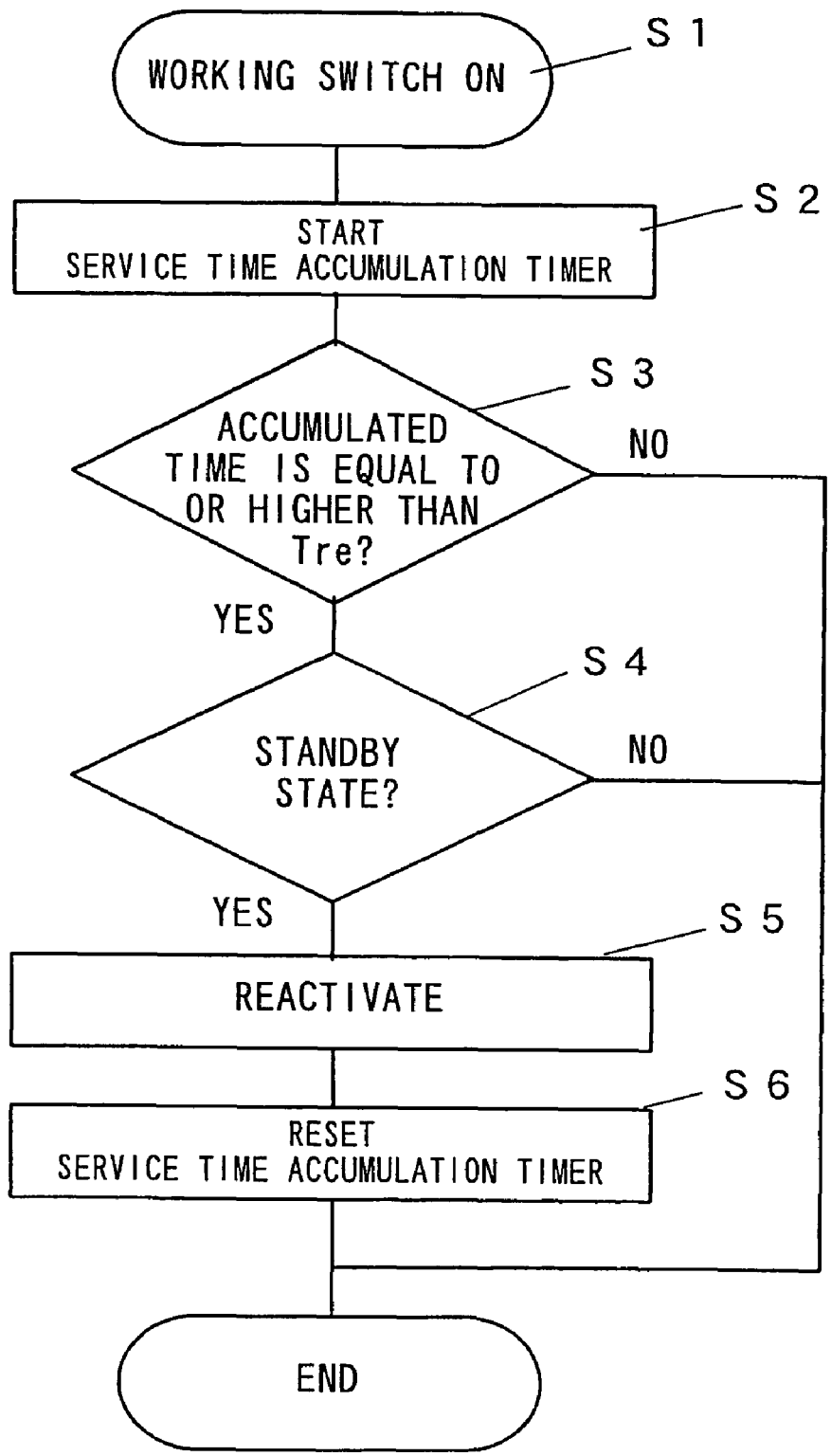
FIG. 8 is a flowchart showing an operation of the reactivation process for an electron emission apparatus according to the embodiment of the invention.

FIG. 8 is a flowchart showing an operation of the reactivation process performed by the controller 110 of the electron emission apparatus, for example, of a display, according to this embodiment.

Firstly, when the display is activated, the working switch SW is turned on and the normal driving state of the electron emission apparatus is achieved (Step S1), the device power source and the device are connected to start the clocking (accumulation of the service time) by the timer of the controller 110 (Step S2). Subsequently, the controller 110 determines whether or not the clocking by the timer reaches the reference time (Tre=3000 hours) (Step S3), and when it is determined that the reference time is elapsed, determines the ON or OFF state of the working switch SW (Step S4). When the working switch SW is OFF and hence is determined to be a standby state, the power supply switch SWr is turned on to apply a sweep voltage from the sweep activation process power source Vr between the electron supply layer and the thin film metal electrode, so that reactivation is executed (Step S5). After the reactivation, the accumulated value obtained by clocking by the timer of the controller 110 is reset to the initial value (Step S6) and the procedure is ended. When it is determined in Step S3 and Step S4 that the reference time is not elapsed, and it is in the driving state with the working switch SW ON, the operation of the reactivation process is not performed.

Figure 9:
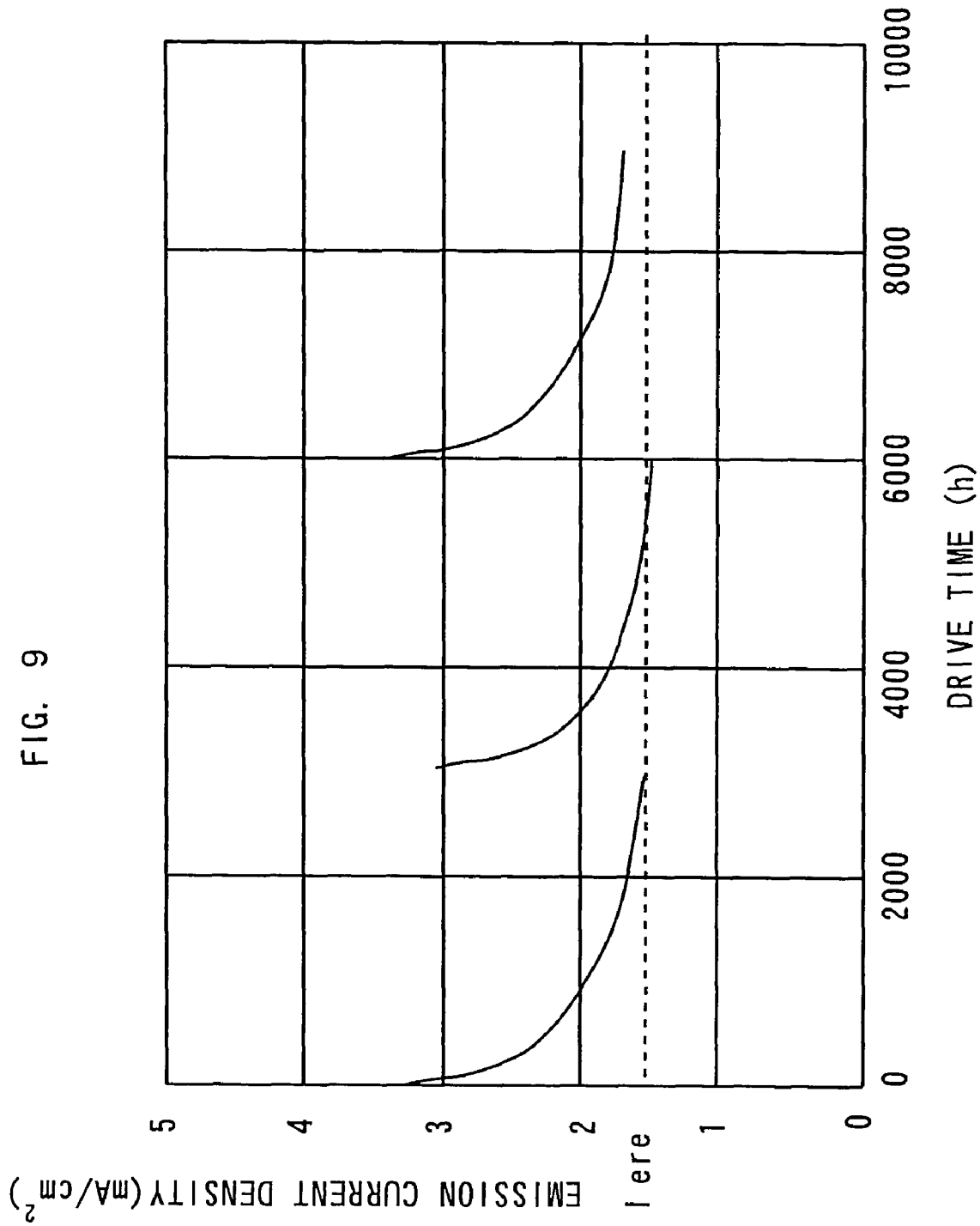
FIG. 9 is a graph showing a change in emission current density with respect to the drive time when the reactivation is repeated in a reference period until the reactivation in the operation of the reactivation process of the electron emission apparatus according to the embodiment of the present invention.

FIG. 9 shows a change of the emission current density with respect to the drive time when the reactivation is repeated assuming that the reference time Tre to the reactivation is 3000 hours. As will be understood from the drawing, the emission current density does not fall below 1 $mA/cm^2$, and hence a significant improvement of the lifetime is achieved.

Figure 10:
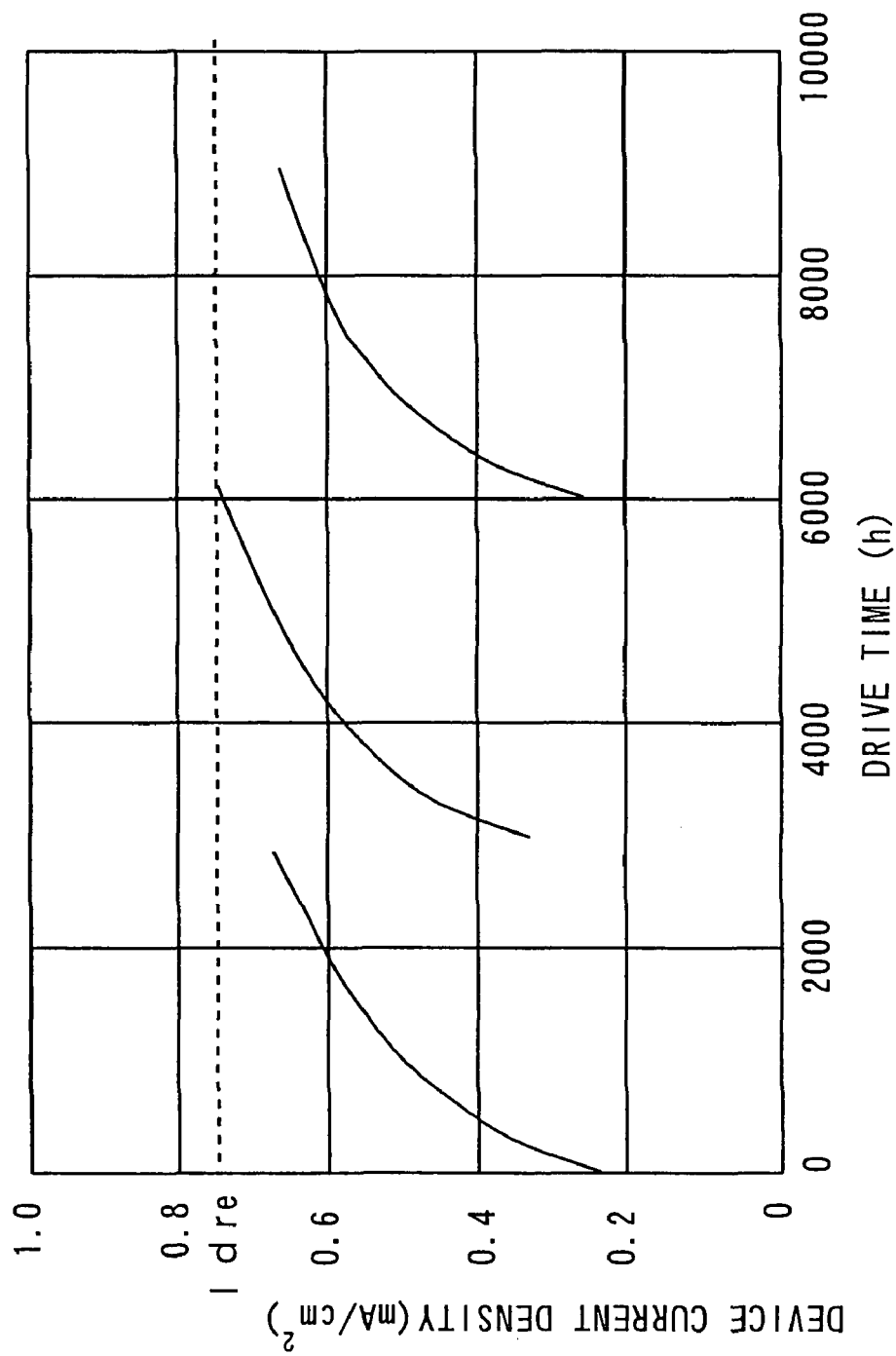
FIG. 10 is a graph showing a change in device current density with respect to the drive time when the reactivation is repeated in a reference period until the reactivation in the operation of the reactivation process of the electron emission apparatus according to the embodiment of the present invention.

The change of the device current density with respect to the drive time when the reactivation is repeated in the same manner will be shown in FIG. 10. As is clear from both drawings, the device current Id behaves like reversed emission current Ie. In other words, it is understood that the emission current and the device current serve as indexes for detecting the timing when the reactivation should be performed. It is difficult to perform the reactivation while electron emission device is being driven for its original purpose. Therefore, for example, in the case of the display, it is performed at a timing when the power source is in the standby state. Determination whether or not it is in the standby state as shown in a flowchart in FIG. 8 is based on this need. In Step S5 in FIG. 8, in addition to the execution of the reactivation according to the self determination of the controller, it is also effective that the controller activates an indicator to inform a user that it is the state in which the reactivation is necessary to cause the user to turn on the switch for starting the operation of the reactivation. In this case, there is an advantage that the reactivation is performed by the self-determination selectively using the time when the user does not use the apparatus apparently. Furthermore, it is effective to activate the indicator for informing the user of the fact that the reactivation is necessary also when the reactivation is performed by the self-determination of the controller. In this case, a notice is provided for preventing the event that the standby state is forcedly released by pulling out a plug during the reactivation and hence the power supply necessary for the reactivation is lost. In the case in which the electron emission device in this embodiment is used in the imaging device being combined with a photoelectric conversion device such as an HARP (High-gain Avalanche Rushing amorphous Photoconductor), it is also possible to provide a blanking time even during the service for reactivating pixels in sequence.

Figure 11:
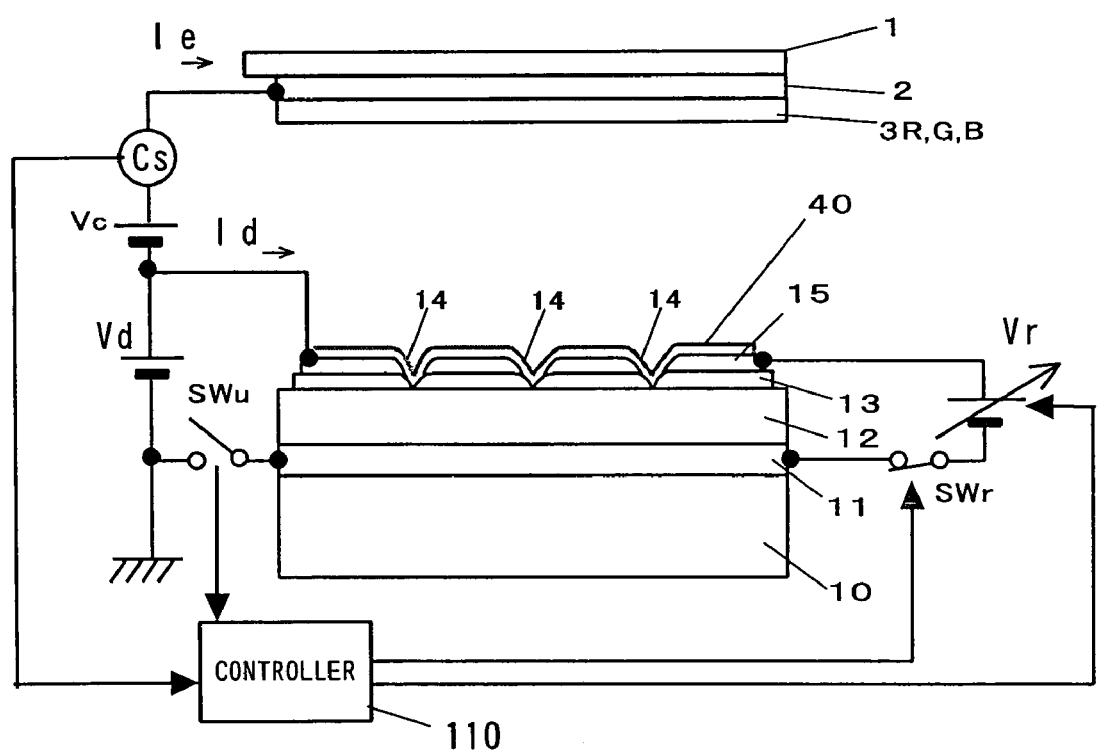
FIG. 11 is a pattern diagram showing a configuration of the electron emission device and the light-emitting unit using the same according to another embodiment of the present invention.

FIG. 11 shows another embodiment. A current detector Cs connected between the anode 2 and the accelerating power source is provided as emission current measuring means so as to be capable of supplying the measurement valve (A/D conversion value) of the current detector Cs to the controller 110, and the emission current generated by the electrons emitted from the thin film metal electrode of the electron emission device is measured. At the timing when the measured emission current falls to a value equal to or below the reference current value (for example, Iere in the characteristic shown in FIG. 9), the voltage application for reactivation is executed (reactivation process) between the electron supply layer and the thin film metal electrode. In this case, it is effective to have another electron source specifically for an emission current monitor in the array of the electron emission source in addition to the electron emission source used for its original purpose. It is because that the electron source often adjusts the quantity of electrons by modulating the voltage or the voltage application time when being used for its original purpose, and such electron source is not suitable for measuring the steady amount of the emission current.

Figure 12:
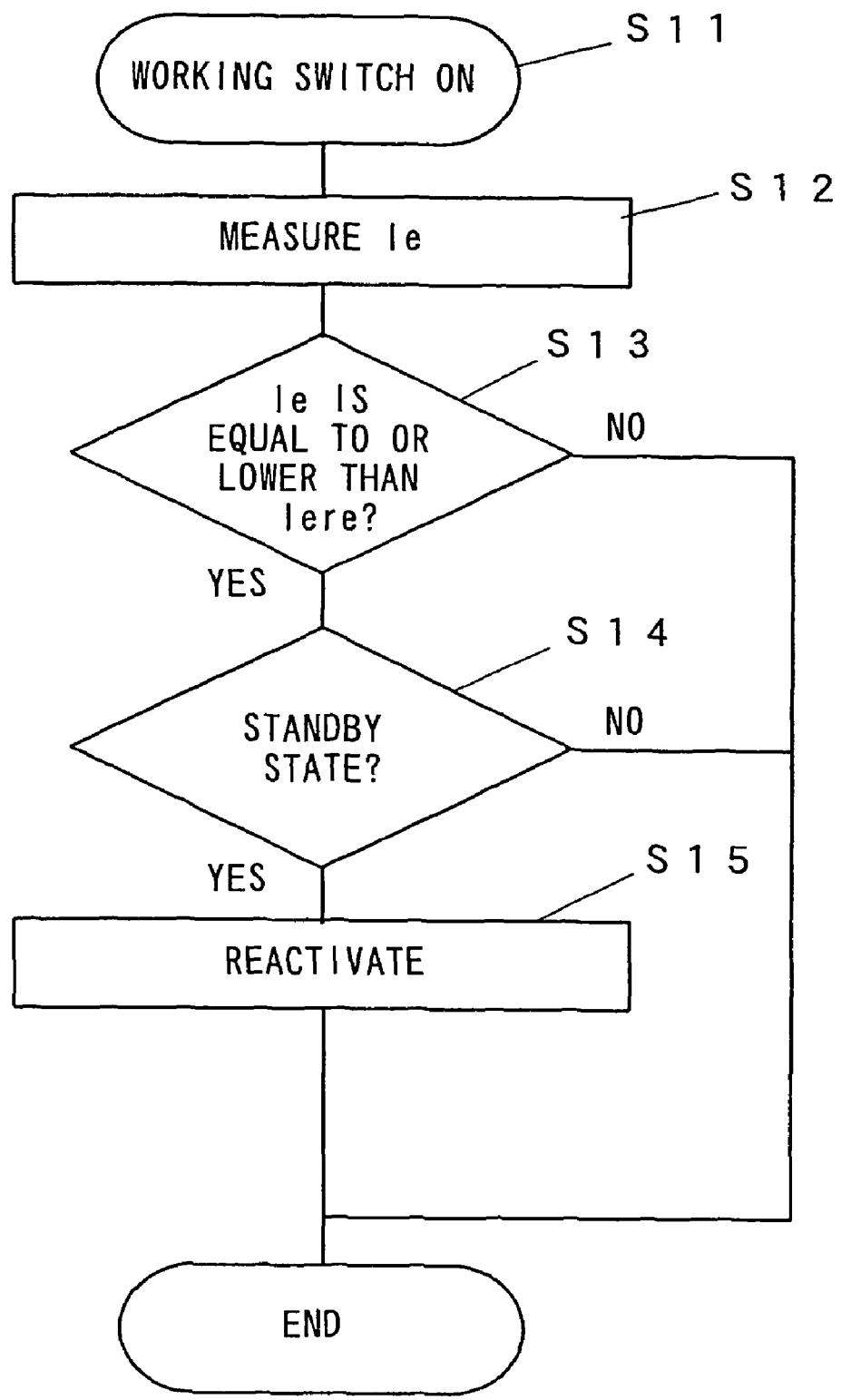
FIG. 12 is a flowchart showing the operation of the reactivation process of the electron emission apparatus according to the another embodiment of the present invention.

FIG. 12 is a flowchart showing the operation of the reactivation process performed by the controller 110 of the electron emission apparatus, for example, of the display according to this embodiment.

Firstly, when the display is activated, the working switch SW is turned on, and the normal driving state of the electron emission apparatus is achieved (Step S11), the device power source and the device are connected to start measurement of the emission current Ie by the controller 110 (Step S12). Subsequently, the controller 110 determines whether or not the measured value falls to the reference current value Iere (Step S13), and when it is determined that the measured value falls to or below the reference, determines the ON or OFF state of the working switch SW (Step S14). When the working switch SW is OFF and hence is determined to be the standby state, the power supply switch SWr is turned on to apply the sweep voltage from the sweep activation process power source Vr between the electron supply layer and the thin film metal electrode, so that the reactivation is executed (Step S15). After the reactivation, the process is ended. When it is determined that the results in Step S13 and Step S14 do not reach the reference value, and the working switch SW is On and hence in the driving state, the operation of the reactivation process is ended.

Figure 13:
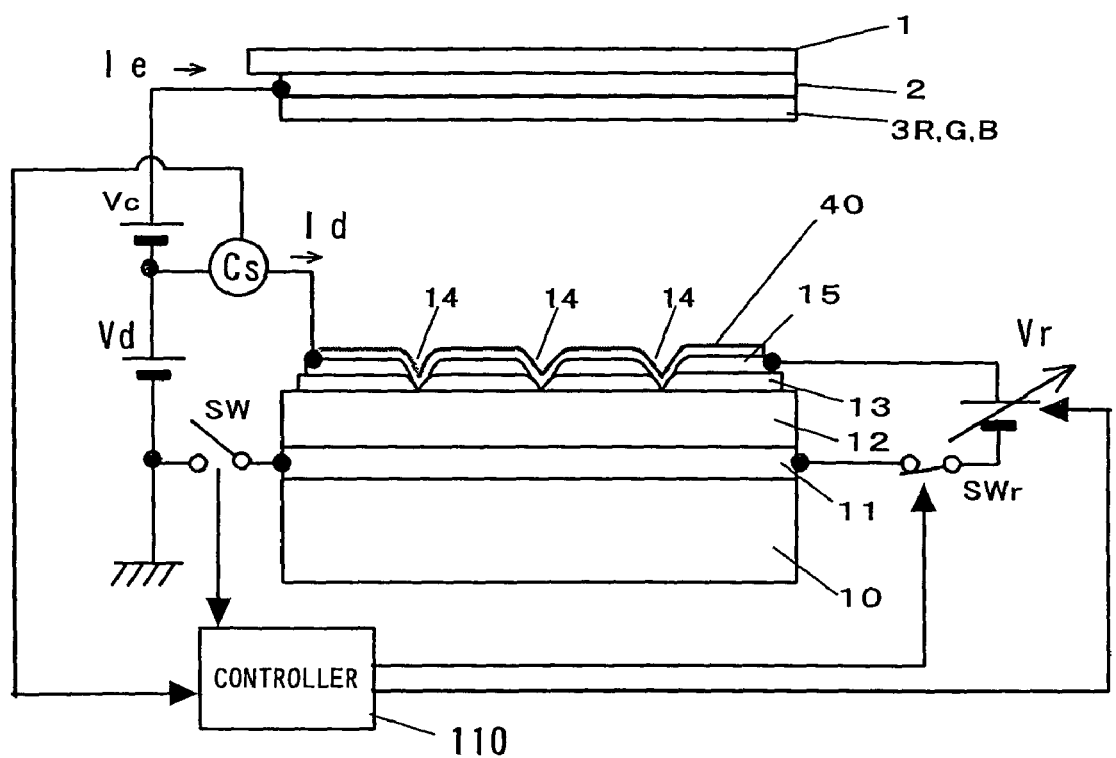
FIG. 13 is a pattern diagram showing a configuration of the electron emission device and the light-emitting unit using the same according to still another embodiment of the present invention.

FIG. 13 shows still another embodiment. A current detector Cs connected between the thin film metal electrode 15 of the electron emission device and the device power source is provided as emission current measuring means so as to be capable of supplying the measured valve of the current detector Cs to the controller 110, and the current between the electron supply layer and the thin film metal electrode is measured. At the timing when the measured device current exceeds the reference current value (for example, Idre in the characteristic shown in FIG. 10), the voltage application for reactivation is executed (reactivation process) to the electron supply layer and the thin film metal electrode.

Figure 14:
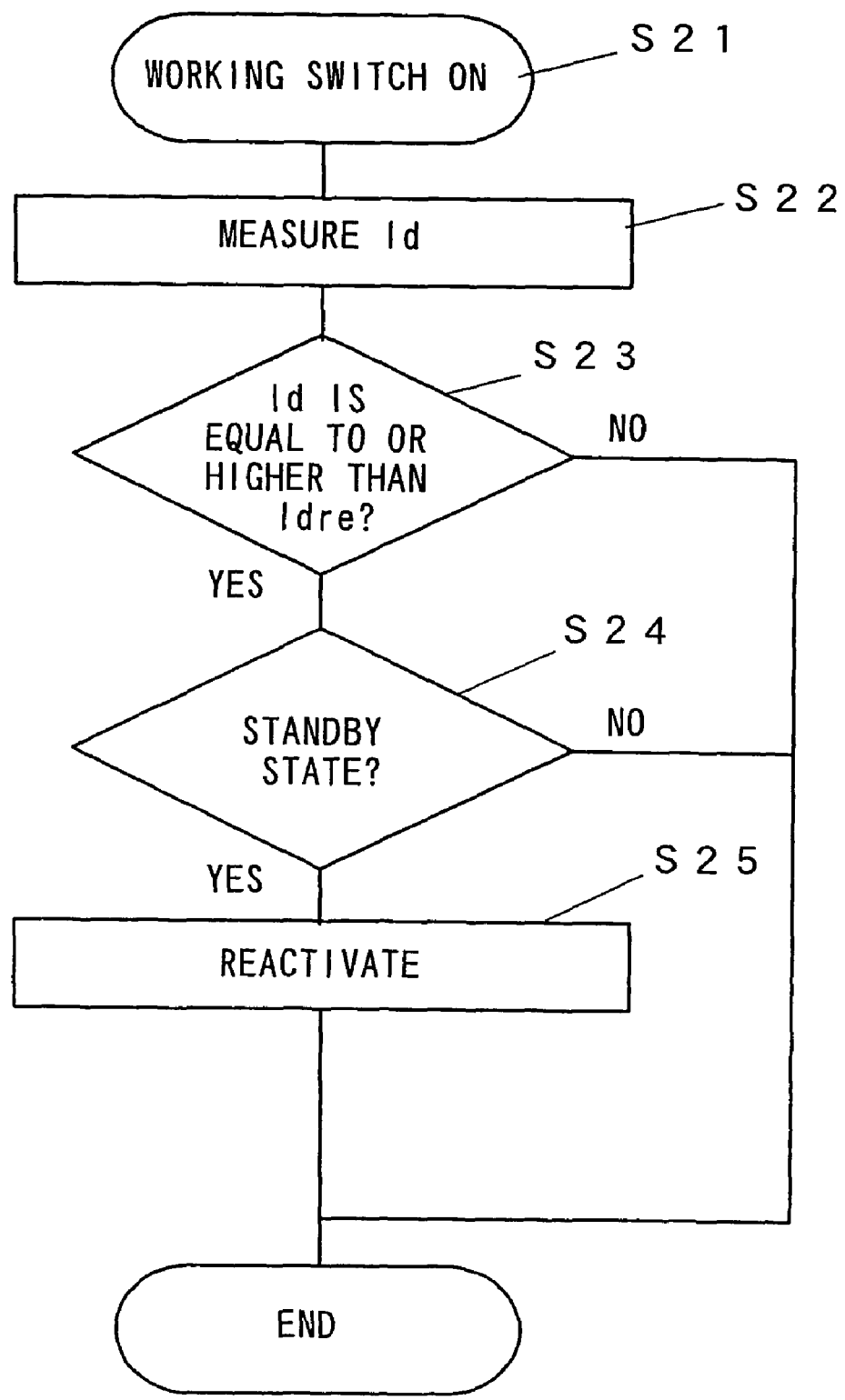
FIG. 14 is a flowchart showing the operation of the reactivation process of the electron emission apparatus according to the still another embodiment of the present invention.
Figure 1:
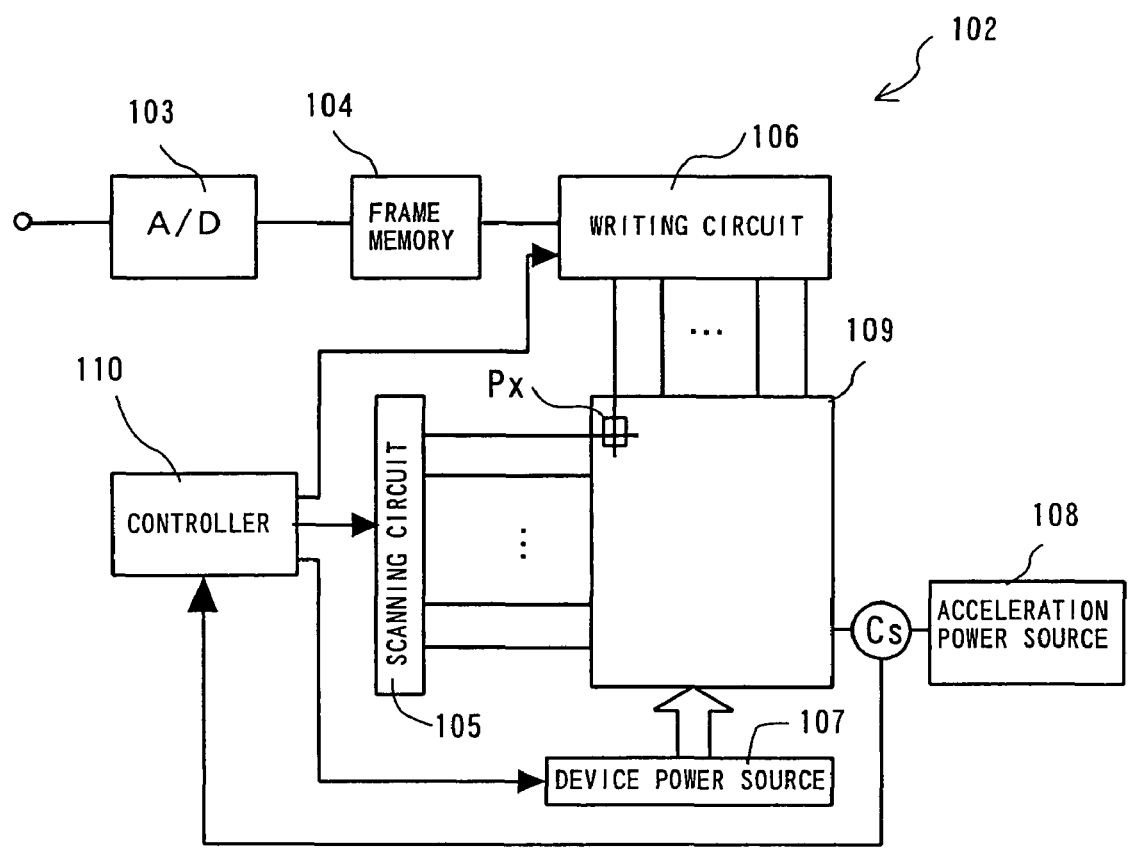

FIG. 14 is a flowchart showing the operation of the reactivation process performed by the controller 110 of the electron emission apparatus, for example, of the display according to this embodiment.

Firstly, when the display is activated, the working switch SW is turned on, and the normal driving state of the electron emission apparatus is achieved (Step S21), the device power source and the device are connected to start measurement of the device current Id by the controller 110 (Step S22). Subsequently, the controller 110 determines whether or not the measured value reaches the reference current value Idre (Step S23), and when it is determined that the measured value exceeds the reference, determines the ON or OFF state of the working switch SW (Step S24). When the working switch SW is OFF and hence is determined to be in the standby state, the power supply switch SWr is turned on to apply the sweep voltage from the sweep activation process power source Vr between the electron supply layer and the thin film metal electrode, so that the reactivation is executed (Step S25). After the reactivation, the process is ended. When it is determined in Step S23 and Step S24 that the measured value does not reach the reference value and the working switch SW is ON and hence is in the driving state, the operation of the reactivation process is ended.

In this manner, through the finding that the electron emission device is a device which can be reactivated, the reactivation of the electron emission device used in displays, imaging devices, and flat-surface light sources after sealing is enabled by applying a predetermined voltage between the electron supply layer and the thin film metal electrode.

(Display Panel Using Electron Emission Apparatus)

FIG. 15 is a block diagram showing a configuration of a display device 102 in which the electron emission device having the configuration as described above is used. In FIG. 15, reference numeral 103 designates an A/D conversion circuit, reference numeral 104 designates a frame memory, reference 105 designates a scanning circuit, reference numeral 106 designates a writing circuit, reference numeral 107 designates a device power source circuit, reference numeral 108 designates an acceleration power source circuit, reference numeral 109 designates a display panel and reference numeral 110 designates a controller. Although not shown, an anode with fluorescent material is provided on the side of the display panel opposing to the plurality of electron emission devices with the intermediary of vacuum space.

The controller 110 is connected to the respective circuits from the frame memory 104 to the acceleration power source circuit 108, and controls them synchronously with the horizontal and vertical synchronous signals of the input video signals.

The A/D conversion circuit 103 receives a supply of the analogue video signals and converts the same to digital video signal data. When the digital video signal data is supplied, the A/D conversion circuit 103 is not necessary. The digital video signal is supplied form the A/D conversion circuit 103 to the frame memory 104, and is written and accumulated under the control of the controller 110.

The frame memory 104 sends the accumulated digital video signal data to the writing circuit 106 by a command from the controller 110. By controlling the writing circuit 106 and the scanning circuit 105 connected to the respective columns and rows of the display panel in sequence by the controller 110, the electron emission time of the electron emission device of the display panel 109 corresponding to the images accumulated in the frame memory is controlled, for example, by a subfield method to obtain a desired image display. The electron power source circuit 107 supplies a constant voltage to the upper electrodes 15 of all the electron emission devices. The accelerating power source circuit 108 supplies a power to the anode of the display panel 109.

Figure 16:
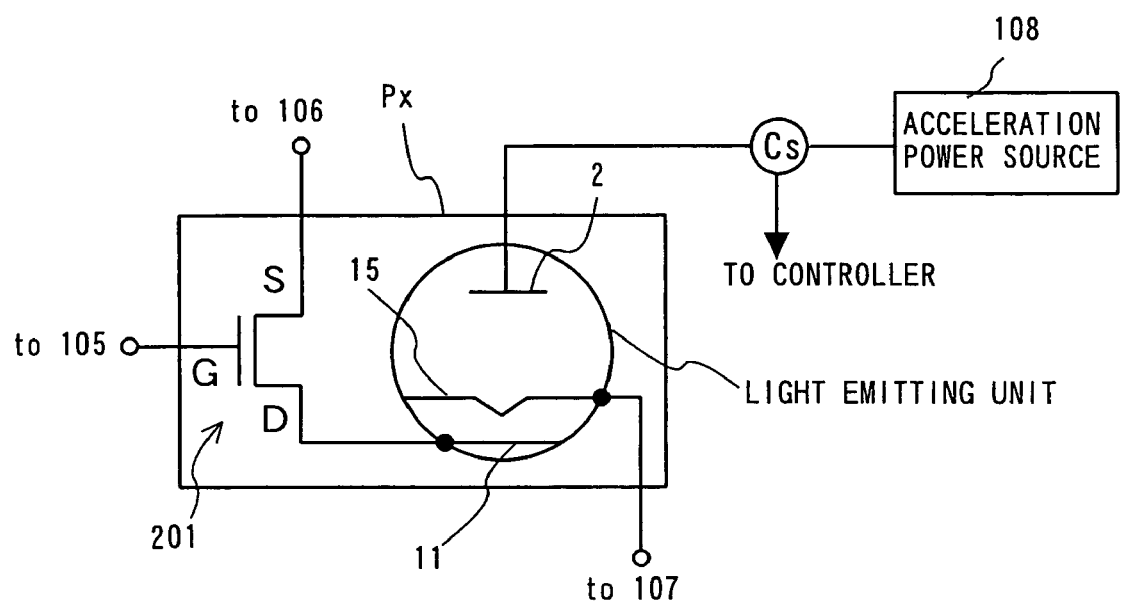
FIG. 16 is a block diagram showing an example of a circuit configuration of a unit pixel in the display device in which the electron emission apparatus according to the still another embodiment of the present invention is used.

Subsequently, FIG. 16 shows an example of a circuit configuration including a FET (Field Effect Transistor) 201 and the light-emitting unit corresponding to a unit pixel Px of the display panel 109. A gate G of the FET 201 is connected to a scanning electrode line to which the scanning signals for scanning the rows are supplied from the scanning circuit 105, and the source S of the FET 201 is connected to a data electrode line to which the signals corresponding to the data in the frame memory 104 are supplied from the writing circuit 106.

A drain D of the FET 201 is connected to the lower electrodes 11 of the electron emission device, and the anode 2 which opposes the electron emission device is connected to the acceleration power source circuit 108.

The operation of electron emission control of the unit pixel of the display panel 109 in which a plurality of circuits are arranged in rows and columns is such that when an ON voltage is supplied to the gate G of the FET 201, an electric current flows from the source S to the drain D, and causes the electrons to be emitted from the upper electrode 15 by the voltage applied to the electrode.

When the gate G of the FET 201 is turned into an OFF voltage, the FET 201 is brought into an opened state, and hence the electron emission from the upper electrode 15 stops.

In addition to the so-called sub field method in which the above described electron emission time is controlled to express the luminance and gradation, a method of controlling the electron emission luminance of the electron emission device on the basis of the voltage supplied to the source S of the FET 201 according to the digital luminance gradation is also be applicable.

In the example described above, an example in which measurement of the electron emission current of the respective electron emission devices is performed before turning off the power source of the apparatus under the control of the controller 110 in the reactivation process is shown. On the other hand, it may be preformed when the power of the apparatus is turned on or, if the timer is integrated, it may be performed at predetermined intervals.

In any cases, all the electron emission devices are subjected to the reactivation process at the same voltage, and hence the electron emission characteristics are restored substantially in a uniform manner over the entire surface.

Since the initial value as the reference value of the reactivation process may be stored as an initial reference value in a suitable memory to control the power source voltage in itself at the time of the reactivation process by comparing the reference value of each time with the initial reference value, the luminance over the entire panel may be controlled to maintain a stable luminance when it is used in the display panel.

As described above, according to this embodiment, even when the extent of deterioration of the characteristics vary among the electron emission devices due to the long time driving, a change in ratio of the deterioration of the luminance among the electron emission devices are solved even after shipment. Therefore, the electron emission display apparatus without generation of uneven luminance on the display is provided.

The invention claimed is:

1. A method of driving an electron emission apparatus which includes a plurality of electron emission devices each having an electron supply layer formed of silicon, a silicon-based mixture or a compound thereof, an insulator layer formed on the electron supply layer and a thin film metal electrode formed on the insulator layer, the plurality of electron emission devices being sealed, the method comprising:
    a driving step for supplying power between the electron supply layer and the thin film metal electrode to cause electrons to be emitted from the electron emission device,
    a reactivating step for applying a reactivating voltage at a level equal to or higher than an applied voltage value which causes discontinuity in differential value of the device current flowing between the electron supply layer and the thin film metal electrode with respect to the applied voltage after the driving step, and
    an emission current measuring step for measuring an emission current generated by electrons emitted from the thin film metal electrode of the electron emission device, wherein the reactivating step is executed at a timing when the measured emission current value is lowered to a value equal to or lower than a reference current value.

2. The method of driving according to claim 1, wherein the insulator layer comprises at least one island area whose film thickness decreases to zero as an electron emitting portion.

3. The method of driving according to claim 1, wherein the electron supply layer is amorphous.

4. The method of driving according to claim 1, wherein the metal thin film of the electron emission device is covered at the surface thereof with a carbon layer including carbon as a main component.

5. The method of driving according to claim 1, comprising a clocking step for measuring a sum of the elapsed time from a point when the power supply to the electron emission device is started, wherein the reactivating step is executed on the basis of the sum of the elapsed time.

6. The method of driving according to claim 1, comprising a device current measuring step for measuring the device current, wherein the reactivating step is executed at a timing when the measured device current value is raised to a value equal to or higher than the reference current value.

7. The method of driving according to claim 1, wherein an applied voltage value which causes discontinuity in differential value of the device current with respect to the applied voltage is a negative resistance starting point.

8. An electron emission apparatus comprising: a plurality of electron emission devices each including an electron supply layer formed of silicon, a silicon-based mixture or a compound thereof, an insulator layer formed on the electron supply layer, and a thin film metal electrode formed on the insulator layer, the plurality of electron emission devices being sealed,
    wherein a reactivation apparatus is provided for applying a reactivating voltage at a level equal to or higher than an applied voltage value which causes discontinuity in differential value of the device current flowing between the electron supply layer and the thin film metal electrode with respect to the applied voltage,
    wherein the reactivation apparatus comprises emission current measuring means that measures an emission current generated by electrons emitted from the thin film metal electrode of the electron emission device, and a control unit that controls execution of application of the reactivation voltage between the electron supply layer and the thin film metal electrode at a timing when the measured emission current value is lowered to a value equal to or lower than a reference current value.

9. The electron emission apparatus according to claim 8, wherein the insulator layer comprises at least one island area whose film thickness decreases to zero as an electron emission portion.

10. The electron emission apparatus according to claim 8, wherein the electron supply layer is amorphous.

11. The electron emission apparatus according to claim 8, wherein the metal thin film of the electron emission device is covered at the surface thereof with a carbon layer including carbon as a main component.

12. The electron emission apparatus according to claim 8, wherein the reactivation apparatus comprises clocking means that measures a sum of elapsed time from a point when the power supply to the electron emission device is started, and a control unit that controls execution of application of the reactivation voltage between the electron supply layer and the thin film metal electrode at a timing when the sum of elapsed time exceeds a reference value.

13. The electron emission apparatus according to claim 12, wherein the control unit comprises an observing unit that observes stop of a driving state in which the electron emission device causes the electrons to be emitted, and gives an instruction to execute application of the reactivation voltage between the electron supply layer and the thin film metal electrode according to the stop of the driving state.

14. The electron emission apparatus according to claim 8, wherein the reactivation apparatus comprises device current measuring means that measures the device current, and a control unit that controls execution of application of the voltage between the electron supply layer and the thin film metal electrode at a timing when the measured device current value is raised to a value equal to or higher than the reference current value.

15. The electron emission apparatus according to claim 8, wherein an applied voltage value which causes discontinuity in differential value of the device current with respect to the applied voltage is a negative resistance starting point.

16. The electron emission apparatus according to claim 8, wherein the electron emission devices are arranged in a matrix pattern so as to be arranged in rows and columns.

* * * * *